US008249338B2

(12) United States Patent
Cazaux et al.

(10) Patent No.: US 8,249,338 B2
(45) Date of Patent: Aug. 21, 2012

(54) DEVICE FOR DETECTING ANOMALIES IN A DIGITAL IMAGE

(75) Inventors: Patrick Cazaux, Le Pian Medoc (FR); Alexandre Espin De La Vega, Merignac (FR); Jean-Pierre Faye, Saint Medard en Jalles (FR)

(73) Assignee: Thales, Neuilly Sur Seine (FR)

( * ) Notice: Subject to any disclaimer, the term of this patent is extended or adjusted under 35 U.S.C. 154(b) by 318 days.

(21) Appl. No.: 12/628,125

(22) Filed: Nov. 30, 2009

(65) Prior Publication Data

US 2010/0142816 A1 Jun. 10, 2010

(30) Foreign Application Priority Data

Dec. 9, 2008 (FR) ..................................... 08 06901

(51) Int. Cl.
*G06K 9/00* (2006.01)
*G06K 9/68* (2006.01)
*G06K 9/36* (2006.01)

(52) U.S. Cl. ......... 382/162; 382/218; 382/219; 382/284

(58) Field of Classification Search .................. 382/162, 382/218, 219, 284
See application file for complete search history.

(56) References Cited

U.S. PATENT DOCUMENTS

2007/0285511 A1* 12/2007 Shafer et al. .................. 348/143

* cited by examiner

*Primary Examiner* — Bernard Krasnic
(74) *Attorney, Agent, or Firm* — LaRiviere, Grubman & Payne, LLP

(57) ABSTRACT

The device facilitates the verification of conformity between an anticipated digital image, or reference image, and a digital image actually obtained. The device implements a method that makes it possible to quickly and effectively distinguish the differences between a reference image and an obtained image. The device comprises receiving an input of two images, reference and obtained, and producing as output a single image, resulting from the merging of the two input images in which the portions common to both images are represented in shades of grey, the differences between the first and the second image being represented in green or red depending on whether they belong to the first or the second image.

3 Claims, 3 Drawing Sheets

RESULTANT IMAGE

ANTICIPATED IMAGE OBTAINED IMAGE

RESULTANT IMAGE

DEVICE FOR DETECTING ANOMALIES IN A DIGITAL IMAGE

PRIORITY CLAIM

This application claims priority to French Patent Application Number 08 06901, Device for Detecting Anomalies in a Digital Image, filed on Dec. 9, 2008.

BACKGROUND OF THE INVENTION

1. Field of the Invention

The field of the invention is that of the design and production of graphic images containing information in the form of geometrical or alphanumeric symbols. For a certain number of applications, the information calculated and displayed on viewing devices must be highly reliable in that it provides vital information concerning the parameters or the correct operation of a system. Obviously worth mentioning are the transportation field, and in particular the aeronautics field, but also any industries requiring secure and reliable checks on graphic images. The images displayed are calculated from algorithms and must correspond to very precise specifications. These specifications can be identified in reference images. Hereinafter in the text, an obtained image will be called calculated image and an anticipated image will be called reference image.

2. Description of the Prior Art

Currently, the checking of an image is handled by an operator directly on a screen showing the obtained image. There are two methods for checking this image.

A first method consists, for the operator, in comparing the obtained image with its textual description. For example, a symbol X must be located at the top of the image. In this case, the text describing the elements to be observed may lead to a particular interpretation on the part of the operator checking the result. For example, if the operator has to check that the symbol X is positioned at the top of the screen, should he consider that, if the symbol X is in the top half of the screen, then it is correctly placed, or indeed should he consider that the symbol must be exactly aligned on the top edge of the screen?

A second method consists, to avoid the above interpretation errors, in producing the anticipated image in graphic form. In this case, there is no longer any possible interpretation. The obtained image must then be strictly identical to the reference image. The comparison of the two graphic formats is, these days, carried out by the naked eye. On a complex image, this method may be very tedious. We are all familiar with the "seven errors" game which consists in finding in two almost identical images the seven differences that separate them. The risks for the person in charge of the check are of:

- spending huge amounts of time in searching for the differences between two images. Often, a difference of a single pixel is invisible to the naked eye and may reveal a greater problem;
- not seeing all the differences between the two images and stopping at the first identified differences.

SUMMARY OF THE INVENTION

The aim of the inventive device is to facilitate the checking of the conformity between an anticipated image, or reference image, and an image actually obtained. The inventive device implements a method that makes it possible to quickly and effectively distinguish the differences between a reference image and an obtained image. The inventive device comprises an algorithm that takes as input the two images, reference and obtained, and produces as output a single image, resulting from the merging of the two input images in which the differences between the first and second image are clearly identifiable.

More specifically, the subject of the invention is a device for detecting anomalies in a digital image, called obtained image O, said image comprising geometrical or alphanumeric symbols, said device comprising means of storing said obtained image and a second image called anticipated image A and a viewing device, the two images consisting of coloured pixels referenced in a plane $\phi(x, y)$, each pixel $P_O(x, y)$ of the obtained image having three red, green and blue components, respectively denoted $P_O(x, y, R)$, $P_O(x, y, G)$ and $P_O(x, y, B)$, and each pixel $P_A(x, y)$ of the anticipated image also having three red, green and blue components, respectively denoted $P_A(x, y, R)$, $P_A(x, y, G)$ and $P_A(x, y, B)$, for any pixel, the weighted sum of its three components being called luminance, the luminances being denoted $P_O(x, y, L)$ and $P_A(x, y, L)$,

- characterized in that said device comprises means of comparing the two obtained and anticipated images, and means of generating a third image, called resultant image, each pixel $P_R(x, y)$ of the resultant image having three red, green and blue components, respectively denoted $P_R(x, y, R)$, $P_R(x, y, G)$ and $P_R(x, y, B)$ defined as follows:
- if the three components of a pixel $P_O(x, y)$ of the obtained image are all identical to the three components of the pixel $P_A(x, y)$ situated in the same place in the anticipated image, then the three components of the pixel $P_R(x, y)$ are all equal and proportional to the luminance $P_A(x, y, L)$ of the corresponding pixel of the anticipated image;
- if at least one of the three components of a pixel $P_O(x, y)$ of the obtained image is different from the corresponding component of a pixel $P_A(x, y)$ situated in the same place in the anticipated image, then the red component $P_R(x, y, R)$ of the pixel $P_R(x, y)$ depends on the luminance $P_O(x, y, L)$ of the corresponding pixel of the obtained image, the green component $P_R(x, y, G)$ of the pixel $P_R(x, y)$ depends on the luminance $P_A(x, y, L)$ of the corresponding pixel of the anticipated image, the blue component being zero.

Advantageously, when the three components of a pixel $P_O(x, y)$ of the obtained image are all identical to the three components of the pixel $P_A(x, y)$, then the proportionality factor is greater than or equal to 0 and less than 1.

Preferentially, when at least one of the three components of a pixel $P_O(x, y)$ of the obtained image is different from the corresponding component of a pixel $P_A(x, y)$ situated in the same place in the anticipated image, then:

- the red component $P_R(x, y, R)$ of the pixel $P_R(x, y)$ is proportional to the luminance $P_O(x, y, L)$ of the corresponding pixel of the obtained image, the proportionality factor being greater than 1 as long as the value of said component remains less than its maximum value pMax, the red component $P_R(x, y, R)$ being equal to its maximum value pMax beyond that,
- the green component $P_R(x, y, G)$ of the pixel $P_R(x, y)$ is proportional to the luminance $P_A(x, y, L)$ of the corresponding pixel of the anticipated image, the proportionality factor being greater than 1 as long as the value of said component remains less than its maximum value pMax, the green component $P_R(x, y, G)$ being equal to its maximum value pMax beyond that.

BRIEF DESCRIPTION OF THE DRAWINGS

The invention will be better understood and other benefits will become apparent from reading the following description, given by way of nonlimiting example, and from the appended figures in which.

MORE DETAILED DESCRIPTION

Figure 1:
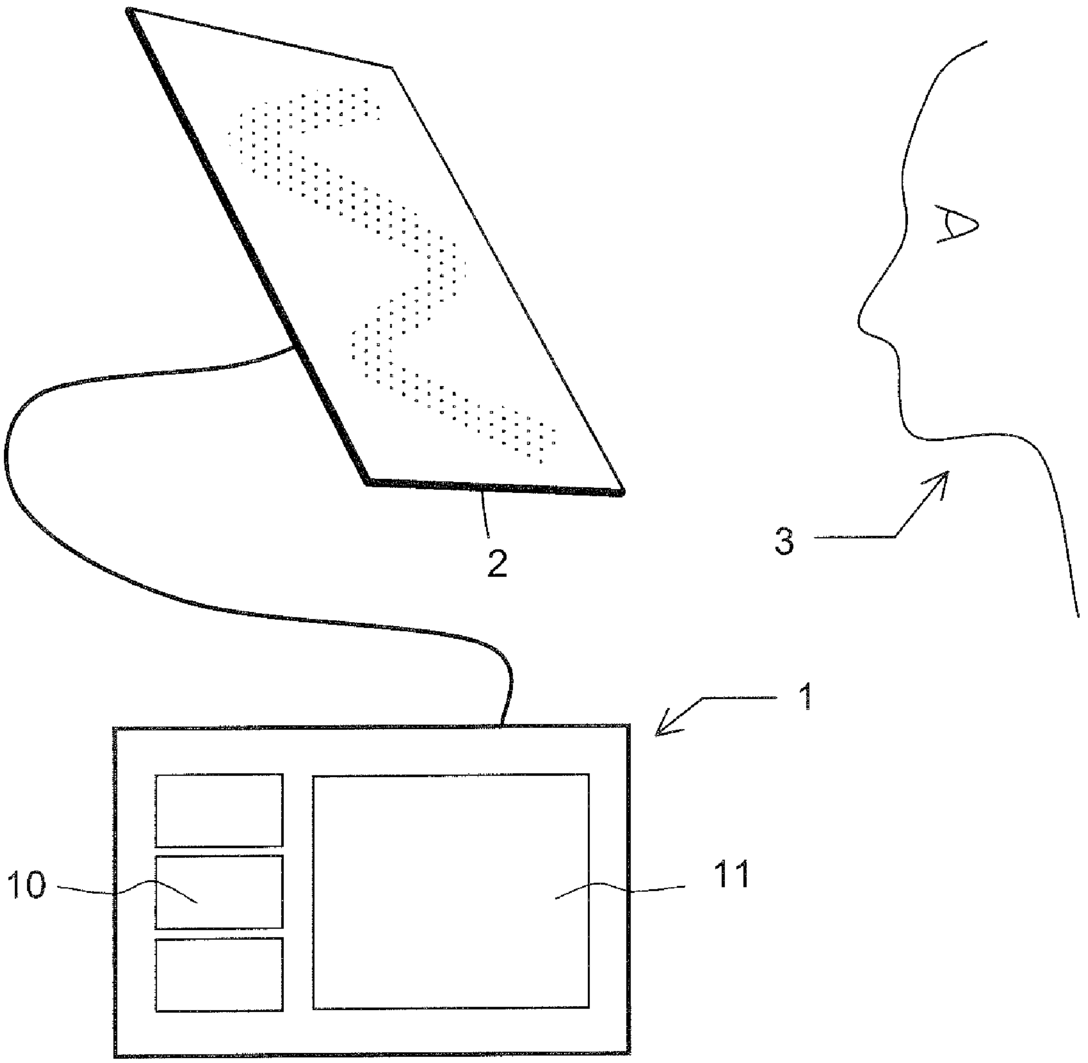
FIG. 1 represents the device according to the invention.

FIG. 1 represents a device according to the invention. It essentially comprises a computer 1 comprising digital image storage means 10, simple means of processing said images making it possible to apply, to the components of their pixels, logic functions and basic mathematical functions (addition and multiplication), means of generating a digital image 11 and a viewing device 2 arranged in front of a human checker 3.

It is known that digital images are made up of coloured pixels P that can be referenced in a plane $\phi(x, y)$, each pixel $P(x, y)$ of an image having three red, green and blue components, respectively denoted $P(x, y, R)$, $P(x, y, G)$ and $P(x, y, B)$. It is understood that the inventive device can be adapted, with no major difficulties, to pixels having three components of different colour, for example red, yellow and blue. It can also be adapted without major difficulties to pixels that have more than three components, for example, two green components, one red component and one blue component.

The inventive device consists in making a comparison, pixel by pixel, component by component, between the two anticipated and obtained images of the same size and of the same pixel format. The device produces an image resulting from the comparison identifying all the identical or different pixels with different colours depending on their origin.

In the comparison between a pixel $P_O(x, y)$ of the obtained image and a pixel $P_A(x, y)$ of the anticipated image, if the three components of the pixels are identical, the algorithm of the device calculates the average of the three colour components, also called luminance $P_A(x, y, L)$, and assigns this value to each of the components of the result pixel $P_R(x, y)$. Thus $$P_O(x,y,L)=(P_O(x,y,R)+P_O(x,y,G)+P_O(x,y,B))/3$$

$$P_A(x,y,L)=(P_A(x,y,R)+P_A(x,y,G)+P_A(x,y,B))/3$$

This pixel therefore has a shade of grey. The overall luminance of the result pixel $P_R(x, y)$ is then reduced by a multiplying coefficient denoted Fd that is less than one on the three colour components. The following then applies:

$$P_R(x,y,R)=P_R(x,y,G)=P_R(x,y,B)=P_A(x,y,L)*Fd$$

The objective of this luminance reduction is to darken all the identical pixels in order to increase the contrast with colour pixels, and to do so even if the identical pixels are very light or white. Ultimately, on completion of a comparison of two identical pixels, the three colour components of the pixel produced $P_R(x, y)$ are always identical. Its colour is therefore always black or shades of grey. It is even possible to envisage Fd being zero so that only the coloured different portions of the two images appear in the resultant image. However, it then becomes more difficult for the operator to determine and locate the fault.

In the comparison of the pixels $P_O(x, y)$ and $P_A(x, y)$, if there is a difference on one or more of the three colour components, the green component $P_R(x, y, G)$ of the pixel $P_R(x, y)$ of the resultant image is proportional to the luminance of the pixel coming from the anticipated or reference image and the red component $P_R(x, y, R)$ of the pixel $P_R(x, y)$ of the resultant image is proportional to the luminance of the pixel coming from the obtained image.

The calculation means of the device then, in the latter case, perform the following operations:

- calculation of the luminance $P_A(x, y, L)$ of the pixel $P_A(x, y)$ derived from the anticipated image, $P_A(x, y, L)$ being equal to the average of the three components $P_A(x, y, R)$, $P_A(x, y, G)$ and $P_A(x, y, B)$ of the pixel $P_A(x, y)$;
- calculation of the luminance $P_O(x, y, L)$ of the pixel $P_O(x, y)$ derived from the obtained image, $P_O(x, y, L)$ being equal to the average of the three components $P_O(x, y, R)$, $P_O(x, y, G)$ and $P_O(x, y, B)$ of the pixel $P_O(x, y)$;
- assignment of the luminance $P_A(x, y, L)$ of the pixel $P_A(x, y)$ to the green component $P_R(x, y, G)$ of the pixel $P_R(x, y)$;
- assignment of the luminance $P_O(x, y, L)$ of the pixel $P_O(x, y)$ to the red component $P_R(x, y, R)$ of the pixel $P_R(x, y)$;
- zeroing of the blue component $P_R(x, y, B)$ of the pixel $P_R(x, y)$;
- increasing of the luminance of the pixel $P_R(x, y)$ by a multiplying coefficient Fr greater than 1 on its green and red components. The benefit of this raising function is to clearly increase the contrast of the colour pixels in the middle of black or grey pixels, including if the initial colour is dark. Obviously, if the multiplying coefficient needs to produce luminances greater than the maximum possible value pMax, the value of the component is limited to this maximum value.

The following then apply:

$$P_R(x,y,R)=\mathrm{MIN}[P_O(x,y,L)*Fr,p\mathrm{Max}]$$

$$P_R(x,y,G)=\mathrm{MIN}[P_A(x,y,L)*Fr,p\mathrm{Max}]$$

$$P_R(x,y,B)=0$$

MIN (X,Y) being a logic function establishing a comparison between two values X and Y, and returning only the lower value.

On the duly generated resultant image, the only elements that appear in colours are the differences between the reference image and the obtained image. Furthermore, the different elements originating from the reference image appear in green and the differences coming from the result image appear in red, the overlap areas appearing in a yellow/orange tone derived from the mixture between green and red. The rest of the image in grey levels makes it possible to better obtain bearings in relation to the original images. Obviously, the choice of the green and red components may be modified. It is possible to imagine other choices of colour, and other choices of representation, such as making the different elements blink.

Figure 2:
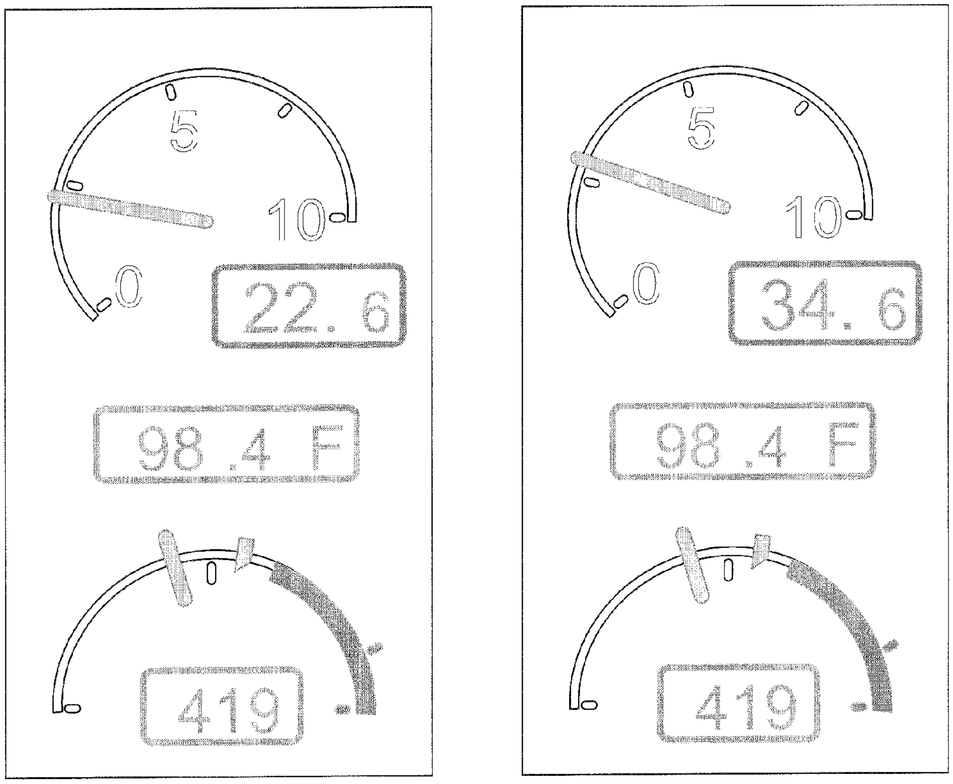
FIG. 2 represents an exemplary anticipated image and obtained image.
Figure 3:
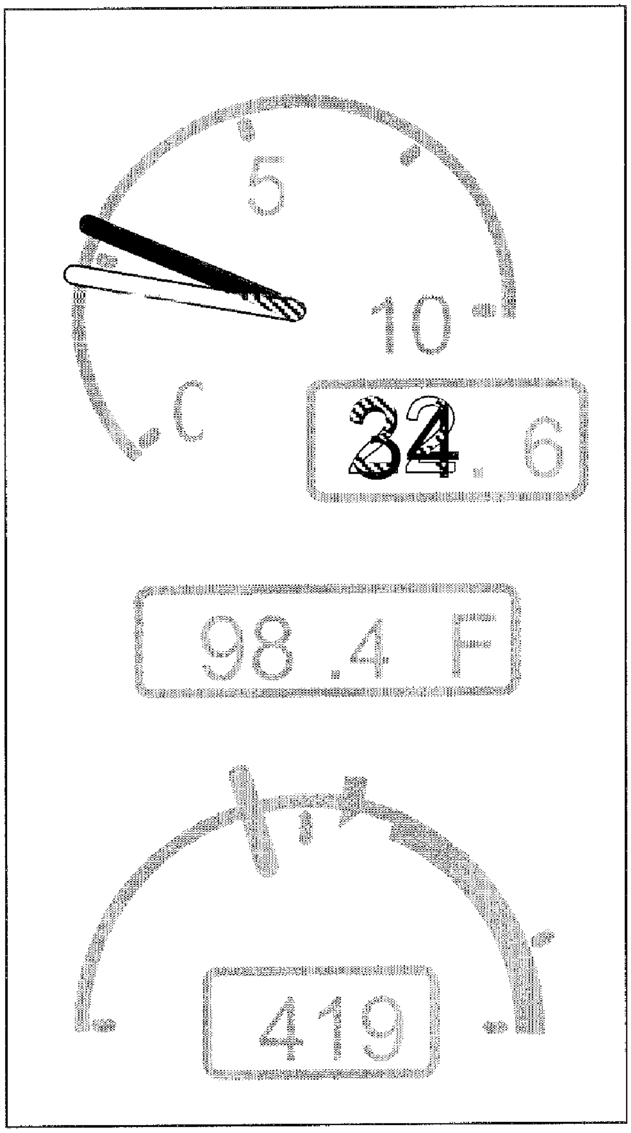
FIG. 3 represents, for the anticipated and obtained images of FIG. 2, the resultant image after processing by the inventive device.

FIGS. 2 and 3 illustrate the method of calculating the resultant image according to the invention, applied to a simplified symbol system essentially comprising two arc-of-circle dials and digital information. This type of image is used notably in aeronautics for displaying aircraft parameters.

In these figures, in order to observe the conventions when it comes to presenting patent figures, the following conventions have been adopted:

In FIG. 2, which on the left represents the anticipated image and on the right the obtained image, the coloured portions are represented in white or in a shade of grey, and the normally black background of the screen is not represented.

In FIG. 3, which represents the resultant image, the grey portions represent the areas common to both images; the white portions are the areas specific to the anticipated image, and normally these areas are coloured green; the black portions are the areas specific to the obtained image, and normally these areas are coloured red. The normally black background is not represented. It will be noted, even though the contrasts are attenuated by the black and white representation of FIG. 3, that an observer immediately perceives in the resultant image the portions that are different between the anticipated image and the obtained image, notably the differences in the values of the numbers and needle position in the top dial, which is the effect sought.

As can be seen in FIG. 3, the creation of a resultant image makes it possible to retain and display all the geometrical characteristics of the symbols present in the obtained image (O), and in the anticipated image (A). The symbols common to both images appear in grey and the different symbols appear in colour.

The invention claimed is:

1. A device for detecting anomalies in a digital image, called obtained image, said obtained image comprising geometrical or alphanumeric symbols, said device comprising means of storing said obtained image and a second image called anticipated image and a viewing device, the two images consisting of colored pixels referenced in a plane $\phi(x, y)$, each pixel $P_O(x, y)$ of the obtained image having three components, red, green and blue, respectively denoted $P_O(x, y, R)$, $P_O(x, y, G)$ and $P_O(x, y, B)$, and each pixel $P_A(x, y)$ of the anticipated image also having three components, red, green and blue, respectively denoted $P_A(x, y, R)$, $P_A(x, y, G)$ and $P_A(x, y, B)$, for any pixel, the sum of its three components being called luminance, the luminances being denoted $P_O(x, y, L)$ and $P_A(x, y, L)$, said device further comprising means of comparing the twe obtained image and the anticipated image, and means of generating a third image, called resultant image, each pixel $P_R(x, y)$ of the resultant image having three components, red, green and blue, respectively denoted $P_R(x, y, R)$, $P_R(x, y, G)$ and $P_R(x, y, B)$ defined as follows: if the three components of a pixel $P_O(x, y)$ of the obtained image are all identical to the three components of the pixel $P_A(x, y)$ situated in the same place in the anticipated image, then the three components of the pixel $P_R(x, y)$ are all equal and proportional to the luminance $P_A(x, y, L)$ of the corresponding pixel of the anticipated image; if at least one of the three components of a pixel $P_O(x, y)$ of the obtained image is different from the corresponding component of a pixel $P_A(x, y)$ situated in the same place in the anticipated image, then the red component $P_R(x, y, R)$ of the pixel $P_R(x, y)$ depends on the luminance $P_O(x, y, L)$ of the corresponding pixel of the obtained image, the green component $P_R(x, y, G)$ of the pixel $P_R(x, y)$ depends on the luminance $P_A(x, y, L)$ of the corresponding pixel of the anticipated image, the blue component $P_R(x, y, B)$ of the pixel $P_R(x, y)$ being zero.

2. The device for detecting anomalies in a digital image according to claim 1, wherein, when the three components of a pixel $P_O(x, y)$ of the obtained image are all identical to the three components of the pixel $P_A(x, y)$, then the proportionality factor between each of the three components of a pixel $P_R(x, y)$ and the luminance $P_A(x, y, L)$ is greater than or equal to 0 and less than 1.

3. The device for detecting anomalies in a digital image according to claim 1, wherein, when at least one of the three components of a pixel $P_O(x, y)$ of the obtained image is different from the corresponding component of a pixel $P_A(x, y)$ situated in the same place in the anticipated image, then: the red component $P_R(x, y, R)$ of the pixel $P_R(x, y)$ is proportional to the luminance $P_O(x, y, L)$ of the corresponding pixel of the obtained image, the proportionality factor between the red component $P_R(x, y, R)$ of the pixel $P_R(x, y)$ and the luminance $P_O(x, y, L)$ being greater than 1 as long as the value of said red component $P_R(x, y, R)$ remains less than its maximum value pMax, the red component $P_R(x, y, R)$ being equal to its maximum value pMax beyond that, the green component $P_R(x, y, G)$ of the pixel $P_R(x, y)$ is proportional to the luminance $P_A(x, y, L)$ of the corresponding pixel of the anticipated image, the proportionality factor between the green component $P_R(x, y, G)$ of the pixel $P_R(x, y)$ and the luminance $P_A(x, y,L)$ being greater than 1 as long as the value of said green component $P_R(x, y, G)$ remains less than its maximum value pMax, the green component $P_R(x, y, G)$ being equal to its maximum value pMax beyond that.

* * * * *

UNITED STATES PATENT AND TRADEMARK OFFICE

CERTIFICATE OF CORRECTION

PATENT NO. : 8,249,338 B2
APPLICATION NO. : 12/628125
DATED : August 21, 2012
INVENTOR(S) : Patrick Cazaux et al.

It is certified that error appears in the above-identified patent and that said Letters Patent is hereby corrected as shown below:

Column 5, line 39, Claim 1; Delete the word “twe”.

Signed and Sealed this
Nineteenth Day of February, 2013

Teresa Stanek Rea
*Acting Director of the United States Patent and Trademark Office*